L. J. KNOWLES.
PISTON FOR STEAM PUMPS.
No. 105,465            Patented July 19, 1870.
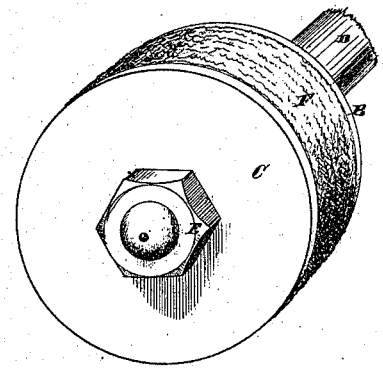
Fig. 1
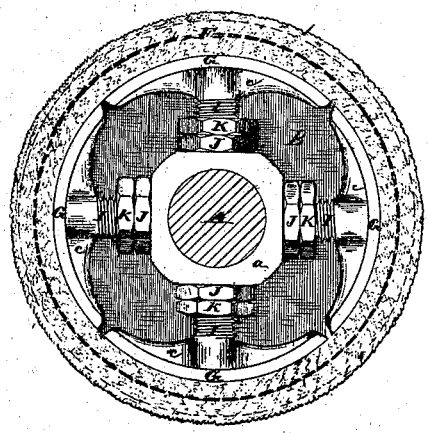 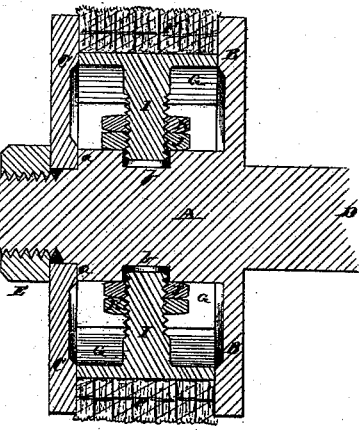
Fig. 2.          Fig. 3
Witnesses,          Inventor
Thos. H. Dodge        Lucius J. Knowles
Geo. H. Miller

United States Patent Office.

LUCIUS J. KNOWLES, OF WORCESTER, MASSACHUSETTS.

*Letters Patent No. 105,465, dated July 19, 1870.*

PISTON FOR STEAM-PUMPS.

The Schedule referred to in these Letters Patent and making part of the same

*To all whom it may concern:*

Be it known that I, LUCIUS J. KNOWLES, of the city and county of Worcester, State of Massachusetts, have invented certain new and useful Improvements in Pistons for Steam-Pumps; and I do hereby declare the following to be a full, clear, and exact description of the same, reference being had to the accompanying drawing forming part of this specification, in which—

Figure 1 represents a perspective view of my improved piston;

Figure 2 represents a transverse section of the same; and

Figure 3 represents a longitudinal central section of the same.

To enable those skilled in the art to which my invention belongs to make and use the same, I will proceed to describe it more in detail.

The nature of my invention consists in an adjustable piston for steam-pumps, the parts of which are constructed and arranged substantially as hereinafter described.

In the drawing—

The part marked A represents the hub of the piston;

B the rear disk;

C the forward disk or follower; and

D the piston-rod.

The rear disk B is formed in one piece with the hub A, while the forward disk C is provided with an opening through its center to fit onto the outer end of the hub A, a shoulder, *a*, being formed thereon, against which the disk C is held by means of a nut, E, which screws onto the projecting end of the hub A outside of the disk, as fully indicated in the drawing.

The rim of the piston, which supports the packing F, is arranged between the disks C and B, and is composed, in this instance, of four sections, G G G G, each section being supported from the hub A by an arm, I.

The outer ends of the arms I are firmly attached to the central part of the sections G, and properly braced and strengthened by ribs *c*, while upon their inner ends, which are provided with screw-threads, are arranged nuts J and K, by means of which the sections G may be adjusted in or out, to increash or diminish the circumference of the packing-rim.

The hub A is recessed out, as shown at *b*, fig. 3, so as to allow space for the ends of the arms I, and permit the nuts J to rest firmly against the sides of the hub A, which latter is made square at the sides, so that the nuts may have a full and equal bearing on all parts.

The nuts K serve as check-nuts to prevent the nuts J from working out of place.

The packing F is arranged in rings upon the outside of the rim G, the sides thereof being supported by the edges of the disks B and C, which project beyond the rim G, as indicated.

By turning down the nuts J K, the sections G are moved outward, and the circumference of the packing-rings thereby enlarged, and, by turning up said nuts, the circumference of the packing-rings is reduced.

Therefore, it will be observed that when the packing becomes worn away upon the outside, the operator has only to remove the disk C and turn down the nuts J K, which will press out the sections G and increase the circumference of the packing F, so that it will fit the cylinder as well as new packing. This operation can be repeated as aften as necessary until the packing-rings are entirely worn away, thereby saving a great amount of labor and expense, which would be required in repacking pistons of the ordinary construction.

In the piston herein illustrated and described there are four sections, G, in the packing-supporting rim, but in pistons of larger diameter a greater number of said sections may be used, if desired.

The packing used in this instance is the same as that described in my application of even date herewith for Letters Patent for improved packing.

Having described my improved piston,

What I claim therein as new and of my invention, and desire to secure by Letters Patent, is—

1. The combination, with the hub A and disks B C, of the adjustable packing-supporting rim, composed of sections G, substantially as and for the purposes stated.

2. The combination, with the recessed hub A and disks B C, of the rim-sections G, arms I, and adjusting-nuts J K, substantially as and for the purposes herein set forth.

3. A piston for steam-pumps, the parts of which is constructed and arranged in relation to each other, substantially as and for the purposes herein set forth.

LUCIUS J. KNOWLES.

Witnesses:
   THOS. H. DODGE,
   GEO. H. MILLER.